(12) United States Patent
Goldie

(10) Patent No.: US 12,254,281 B2
(45) Date of Patent: Mar. 18, 2025

(54) SYSTEMS AND METHODS FOR GENERATING IMPROVED EMBEDDINGS WHILE CONSUMING FEWER COMPUTATIONAL RESOURCES

(71) Applicant: Google LLC, Mountain View, CA (US)

(72) Inventor: Anna Darling Goldie, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 156 days.

(21) Appl. No.: 17/842,288

(22) Filed: Jun. 16, 2022

(65) Prior Publication Data
US 2022/0405493 A1 Dec. 22, 2022

Related U.S. Application Data

(60) Provisional application No. 63/211,233, filed on Jun. 16, 2021.

(51) Int. Cl.
G06F 40/58 (2020.01)
G06F 18/2137 (2023.01)
G06F 40/216 (2020.01)
G06F 40/284 (2020.01)

(52) U.S. Cl.
CPC ........ G06F 40/58 (2020.01); G06F 18/21375 (2023.01); G06F 40/216 (2020.01); G06F 40/284 (2020.01)

(58) Field of Classification Search
None
See application file for complete search history.

(56) References Cited

U.S. PATENT DOCUMENTS

| | | | | |
|---|---|---|---|---|
| 2020/0410157 A1* | 12/2020 | van de Kerkhof | ... | G06F 40/166 |
| 2021/0027157 A1* | 1/2021 | Chen | ........................ | G06N 3/08 |
| 2021/0042800 A1* | 2/2021 | Chandra | ................. | H04L 51/02 |
| 2021/0174020 A1* | 6/2021 | Sohn | ...................... | H04L 51/216 |
| 2021/0241309 A1* | 8/2021 | Wolf, Jr. | .................. | G06N 5/04 |
| 2022/0261545 A1* | 8/2022 | Lauber | .................. | G06F 16/355 |
| 2023/0214177 A1* | 7/2023 | Zheng | ...................... | G06N 3/04 |
| | | | | 708/205 |
| 2024/0232572 A1* | 7/2024 | Wang | .................. | G06F 18/2193 |

FOREIGN PATENT DOCUMENTS

WO WO2020/091829 * 5/2020 ............. G06F 17/22

OTHER PUBLICATIONS

Adiwardana et al, "Towards a Human-Like Open-Domain Chatbot", arXiv:2001.09977v3, Feb. 27, 2020, 38 pages.
Arora et al, "A Simple but Tough-to-Beat Baseline for Sentence Embeddings", International Conference on Learning Representations, Apr. 24-26, 2017, Toulon, France, 16 pages.

(Continued)

*Primary Examiner* — Douglas Godbold
(74) *Attorney, Agent, or Firm* — DORITY & MANNING P.A.

(57) ABSTRACT

Example aspects of the present disclosure are directed to systems and methods for generation of improved language embeddings (e.g., entity embeddings for natural language tokens) which provide improved model performance. In addition, the proposed techniques require less computational consumption relative to previous approaches.

20 Claims, 8 Drawing Sheets

(56) References Cited

OTHER PUBLICATIONS

Baroni et al, "The WaCky Wide Web: A Collection of Very Large Linguistically Processed Web-Crawled Corpora", Language Resources and Evaluation, 2009, 22 pages.

Brants et al, "Web It 5-gram version 1 ldc2006t13", Linguistic Data Consortium, https://catalog.ldc.upenn.edu/LDC2006T13, retrieved on Aug. 16, 2022, 2 pages.

Brown et al, "Language Models are Few-Shot Learners" arXiv:2005. 14165v4, Jul. 22, 2020, 75 pages.

Bruni et al, "Multimodal Distributional Semantics", Journal of Artificial Intelligence Research, vol. 49, 2014, 47 pages.

Ethayarajh, "How Contextual are Contextualized Word Representations? Comparing the Geometry of BERT, ELMo, and GPT-2 Embeddings", arXiv:1909.00512v1, Sep. 2, 2019, 11 pages.

Finkelstein et al, "Placing Search in Context: The Concept Revisited", Transactions on Information Systems, vol. 20, No. 1, pp. 116-131.

Gerz et al, "SimVerb-3500: A Large-Scale Evaluation Set of Verb Similarity", arXiv:1608.00869v4, Sep. 20, 2016, 12 pages.

Hill et al, SimLex-999: Evaluating Semantic Models with (Genuine) Similarity Estimation. Computational Linguistics, vol. 41, No. 4, pp. 665-695.

Jacob Devlin et al, "BERT: Pre-training of Deep Bidirectional Transformers for Language Understanding", arXiv:1810.04805v2, May 24, 2019, 16 pages.

Luong et al, "Better Word Representations with Recursive Neural Networks for Morphology", Conference on Computational Natural Language Learning, 2013, 10 pages.

Mikolov et al, "Efficient Estimation of Word Representations in Vector Space", arXiv:1301.3781v3, Sep. 7, 2013, 12 pages.

Mu et al., "All-but-the-Top: Simple and Effective Postprocessing for Word Representations", arXiv:1702.01417v2, Mar. 19. 2018. 25 pages.

Pennington et al., "GloVe: Global Vectors for Word Representation", Conference on Empirical Methods in Natural Language Processing, Oct. 2014, Doha, Qatar, 12 pages.

Radford et al., "Language Models are Unsupervised Multitask Learners", 2019, 24 pages.

Rishi Bommasani et al, "Interpreting Pretrained Contextualized Representations via Reductions to Static Embeddings", Meeting of the Association for Computational Linguistics, Jul. 5-10, 2020, Seattle, Washington, United States, pp. 4758-4781.

Rubenstein et al., "Contextual Correlates of Synonymy", Communications of the ACM, vol. 8, No. 10, 1965, pp. 627-633.

Sahlgren et al, "The Gavagai Living Lexicon", International Conference on Language Resources and Evaluation, May 2016, Portoroz, Slovenia, pp. 344-350.

Wolf et al, "Transformers: State-of-the-Art Natural Language Processing", arXiv:1910.03771v5, Jul. 14, 2020, 8 pages.

* cited by examiner

SYSTEMS AND METHODS FOR GENERATING IMPROVED EMBEDDINGS WHILE CONSUMING FEWER COMPUTATIONAL RESOURCES

PRIORITY CLAIM

The present application is based on and claims priority to U.S. Provisional Application 63/211,233 having a filing date of Jun. 16, 2021, which is incorporated by reference herein in its entirety.

FIELD

The present disclosure relates generally to machine learning. More particularly, the present disclosure relates to systems and methods for generating improved embeddings while consuming fewer computational resources.

BACKGROUND

Entity embeddings (e.g., natural language token embeddings) have significant importance and value in many machine learning contexts, including vision tasks, document classification, genetic analysis, an many Natural Language Processing (NLP) tasks such as machine translation, conversational modeling, and lexical similarity tasks. Traditionally, in the NLP domain, embeddings have taken the form of static embeddings, such as word2vec and GloVe, which are pre-trained and then stored in embedding tables for fast lookup at training and inference time. However, recent years have seen the rise of contextual word embeddings in large-scale pretrained language models (LMs), such as BERT, GPT-3, and Meena. There has also been recent work on reducing contextual word embeddings to static word embeddings via context pooling or principal component analysis, in order to avoid the memory and compute cost of generating contextual word embeddings on the fly.

Prior work has shown the efficacy of postprocessing transformations on standard learned word and sentence representations. One example approach centers the mean of the word representations, while another example approach removes the first principal component from sentence embeddings. A further example approach (which is referred to as ABTT) combines these ideas at the word level, subtracting the global mean and nulling early principal components. ABTT considers the full vocabulary when removing principal components and is therefore dataset-agnostic, which is touted as a key advantage distinguishing the ABTT approach from prior work.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to provide improved embedding-based model performance with reduced computational consumption. The method includes obtaining, by a computing system comprising one or more computing devices, an input set of entity embeddings, wherein the input set of entity embeddings comprises a plurality of embeddings respectively associated with a plurality of entities included in a vocabulary. The method includes selecting, by the computing system, a subset of entity embeddings that comprises a subset of the plurality of embeddings respectively associated with a subset of the plurality of entities. The method includes performing, by the computing system, one or more embedding modifications on at least the subset of entity embeddings to produce a modified set of entity embeddings. The one or more embedding modifications comprising one or both of: subtracting, by the computing system, a mean of the subset of entity embeddings from at least each entity embedding included in the subset of the plurality of embeddings; and removing, by the computing system, one or more principal components of the subset of entity embeddings from at least each entity embedding included in the subset of the plurality of embeddings. The method includes outputting, by the computing system, the modified set of entity embeddings as an output set of entity embeddings.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
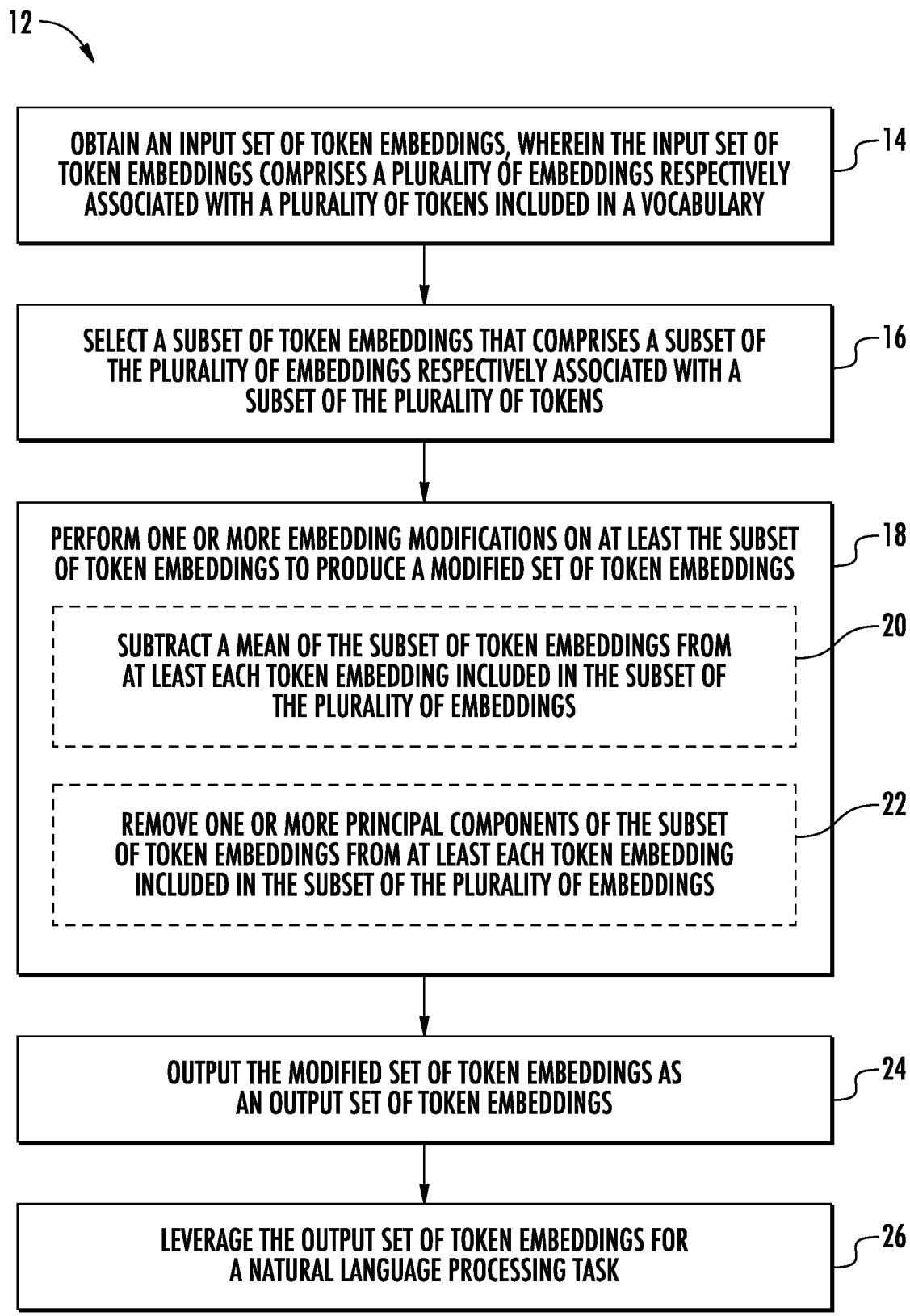
FIG. 1 depicts a flow chart diagram of an example method to generate improved language embeddings while consuming fewer computational resources according to example embodiments of the present disclosure.

Reference numerals that are repeated across plural figures are intended to identify the same features in various implementations.

DETAILED DESCRIPTION

Overview

Example aspects of the present disclosure are directed to systems and methods for generation of improved embeddings (e.g., token embeddings for natural language tokens) which provide improved model performance. In addition, the proposed techniques require less computational consumption relative to previous approaches.

The example embeddings described herein can be any learned representations for entities. For example, the entities can be discrete items, categories, objects, datafiles, or entities. Example entities can include natural language tokens (e.g., words), documents, images, webpages, products, users, proteins, molecules, or other items or entities. While example descriptions herein focus on token embeddings in the NLP domain, the approaches described herein are equally applicable to many different domains or types of entities.

More particularly, prior work has shown that embedding modifications such as mean subtraction and removal of early principal components can enhance performance on lexical similarity tasks. However, these modifications were thought to work best when applied to the entire vocabulary or set of embeddings. As used herein, the term vocabulary refers to a defined set of entities.

In contrast, the present disclosure demonstrates that even further gains (e.g., up to 20% overall) can be achieved by performing embedding transformations on only a strategic subset of the vocabulary, all while consuming less compute and memory resources. Stated differently, performing embedding transformations on the full vocabulary is not only more computationally expensive, but it also yields lower performance than considering only a small subset. The present disclosure also demonstrates that the particular subset of embeddings that is modified need not be dataset-specific. Instead, in some implementations, the subset may be selected as a function of underlying unigram frequency.

By operating on a subset of the vocabulary, example implementations of the present disclosure were able to achieve performance gains across a broad range of lexical similarity tasks (e.g., MEN, RW, WordSim, SimVerb, SimLex, and RG65). Not only does this behavior offer insights into the linguistic properties of these word representations, but the proposed method improves the performance of these word embeddings on both static word embeddings (e.g., word2vec and GloVe) as well as contextual word embeddings that have been reduced to static word embeddings (e.g., BERT and GPT-2) across a broad range of NLP tasks.

Thus, the systems and methods of the present disclosure provide a number of technical effects and benefits. As one example technical effect and benefit, the systems and methods of the present disclosure are able to generate improved language embeddings which result in improved model performance across a number of different tasks, as described in more detail below. Thus, embeddings generated according to the proposed approach can improve the performance (e.g., accuracy) of a model and of a computing system itself on a number of different tasks. Improved model performance can result in reduced computational consumption as models and other computing systems do not need to be re-executed to correct erroneous predictions.

As another example technical effect and benefit, the systems and methods of the present disclosure are able to reduce resource consumption such as reduced consumption of computational resources such as processor usage, memory usage, network bandwidth, etc. In particular, past approaches were believed to operate best when certain embedding modifications were computed for and applied to all embeddings in a vocabulary. By contrast, the present disclosure enables superior results when the modifications are computed for and/or applied to only a smaller subset of the vocabulary. As such, a smaller number of computational or other computerized operations need to be performed, thereby conserving computational resources such as processor usage, memory usage, network bandwidth, etc.

As another example technical effect and benefit, the systems and methods of the present disclosure enable improved embeddings, which represent a form of data compression. In particular, embeddings provide compressed representations of the entities. Therefore, transmission of embeddings requires less computational resources versus transmitting the entities themselves. Furthermore, an embedding-based model is able to be faster and/or consume fewer computational resources as compared to a model that processes the entire dataset of entities (e.g., the entire sequence of text rather than the embedding-based representation). Thus, embeddings both represent a reduced-size data representation in and of themselves and also enable the use of smaller, more efficient machine-learned models.

With reference now to the Figures, example embodiments of the present disclosure will be discussed in further detail.

Example Embedding Modification Techniques

FIG. 1 depicts a flow chart diagram of an example method 12 to generate improved language embeddings while consuming fewer computational resources according to example embodiments of the present disclosure.

At 14, a computing system can obtain an input set of entity embeddings. The input set of entity embeddings can include a plurality of embeddings respectively associated with a plurality of entities included in a vocabulary. The entities can be or include, for example, natural language words or other natural language tokens such as subwords.

In some implementations, the input set of entity embeddings comprise a set of static entity embeddings. In some implementations, the input set of entity embeddings comprise a set of contextual entity embeddings that have been reduced to a set of static entity embeddings.

At 16, the computing system can select a subset of entity embeddings that comprises a subset of the plurality of embeddings respectively associated with a subset of the plurality of entities. Various techniques can be performed to select the subset of entity embeddings.

As one example, in some implementations, selecting, by the computing system, the subset of entity embeddings can include selecting, by the computing system, the subset of entity embeddings based on a frequency of appearance of the plurality of embeddings in a corpus (e.g., a text corpus). For example, selecting, by the computing system, the subset of entity embeddings based on the frequency of appearance of the plurality of embeddings in the corpus can include selecting, by the computing system, a percentage of the plurality of embeddings that appear most frequently in the corpus. For example, the percentage can be between two to five percent.

As another example, in some implementations, selecting, by the computing system, the subset of entity embeddings can include selecting, by the computing system, the subset of entity embeddings to include only entity embeddings that correspond to nouns.

As another example, in some implementations, selecting, by the computing system, the subset of entity embeddings can include selecting, by the computing system, the subset of entity embeddings to include only entity embeddings that are included in an expected vocabulary that is different from the vocabulary. For example, the expected vocabulary can be a vocabulary associated with a task for which a corresponding model is expected to perform a natural language task.

As another example, in some implementations, selecting, by the computing system, the subset of entity embeddings can include selecting, by the computing system, the subset of entity embeddings to include only entity embeddings that correspond to tokens included in a particular language. For example, selecting, by the computing system, the subset of entity embeddings to include only entity embeddings that correspond to tokens included in a particular language can include selecting, by the computing system, the subset of entity embeddings to include only entity embeddings that are included in the English language according to some definition such as the Natural Language Toolkit.

At 18, the computing system can perform one or more embedding modifications on at least the subset of entity embeddings to produce a modified set of entity embeddings. Various modification technique(s) can be performed in various ordering(s).

In some implementations, the one or more embedding modifications can include subtracting 20 a mean of the subset of entity embeddings from at least each entity embedding included in the subset of the plurality of embeddings. In some implementations, the mean of the subset of entity embeddings can be subtracted from only the entity embeddings included in the subset of the plurality of embeddings. In other implementations, the mean of the subset of entity embeddings can be subtracted from all of the plurality of embeddings.

In some implementations, in addition or alternatively to other modification techniques, the one or more embedding modifications can include removing 22 one or more principal components of the subset of entity embeddings from at least each entity embedding included in the subset of the plurality of embeddings. In some implementations, the first D principal components can be removed, where D is a positive integer. In some implementations, one or more principal components of the subset of entity embeddings can be removed from only the entity embeddings included in the subset of the plurality of embeddings. In other implementations, one or more principal components of the subset of entity embeddings can be removed from all of the plurality of embeddings.

At 24, the computing system can output the modified set of entity embeddings as an output set of entity embeddings. At 26, the computing system can leverage the output set of entity embeddings to perform a machine learning task such as an image analysis task, a document or entity classification or retrieval task, a genetics analysis task, and/or a natural language task. For example, performing the natural language task can include using, by the computing system, the output set of entity embeddings to predict one or more predicted tokens based on a context. As another example, performing the natural language task can include using, by the computing system, the output set of entity embeddings to predict one or more sequences of predicted tokens based on a context. As yet another example, performing the natural language task can include training, by the computing system, a machine-learned language model using the output set of entity embeddings; and using the machine-learned language model to perform the natural language task. Example natural language tasks include machine translation, conversational modeling, lexical similarity tasks, language generation, query prediction and/or answering, summarization, named-entity recognition, parts-of-speech tagging, sentiment analysis, speech recognition, and many others.

One example algorithm that implements the above method is as follows. The present disclosure is not limited to the following example algorithm.

---

Algorithm 1: Subtracting the Mean
and Removing Principal Components

---

Output: Postprocessed Embeddings
Input:
    $E_{original}$: input embeddings as row vectors;
    $V_{subset}$: a subset of the full vocabulary $V_{full}$.
for k ← 1 to $|V_{subset}|$ do
    Sum ← Sum + $E_{original}[k]$
end
Mean ← Sum / $|V_{subset}|$
for k ← 1 to $|V_{full}|$ do
    $E_{subtracted}[k]$ ← $E_{original}[k]$ − Mean
end
$v_1, ..., v_d$ ← PCA($E_{subtracted}[1: |V_{subset}|]$)
for d ← 1 to D do
    for k ← 1 to $|V_{full}|$ do
        $E_{removed}[k]$ ← $E_{subtracted}[k]$ − $v_d^T \cdot E_{subtracted}[k]$
    end
end

---

Example Experiments

Example Benchmarks

To evaluate the resulting embeddings, performance was compared on a suite of example lexical similarity benchmarks.

MEN is composed of 3,000 pairs sampled from ukWaC and Wackypedia corpora labeled with their degree of semantic relatedness.

RW consists of 2,034 pairs of rare words and human ratings of their similarity on a scale of 1 to 10.

WordSimilarity-353 contains 353 pairs of English words along with human-assigned similarity and relatedness scores ranging from 0 (completely unsimilar) to 10 (absolutely similar).

SimVerb has 3,500 verb pairs with human judgments of their similarity.

SimLex-999 contains approximately one thousand pairs of adjectives, nouns, and verbs labeled with their degree of similarity by Amazon Mechanical Turk workers.

RG65 consists of 65 English noun pairs and human ratings of their similarity.

Example Static Word Embeddings

Some example experiments consider the two most prevalent static word embeddings, namely GloVe and word2vec. For GloVe, embeddings were used which were trained on Common Crawl (2.2M vocab, 300d vectors). For word2vec, embeddings were used which were trained on Google New 2013 (2.8M vocab, 300d vectors, Gensim Continuous Skipgram).

Example Frequency-Based Subset Selection

One example approach first sorts the input vocabulary in order of descending match count in a text corpus (e.g., the Google NGrams Corpus), yielding a vocabulary of ~1M unique tokens.

Figure 2:
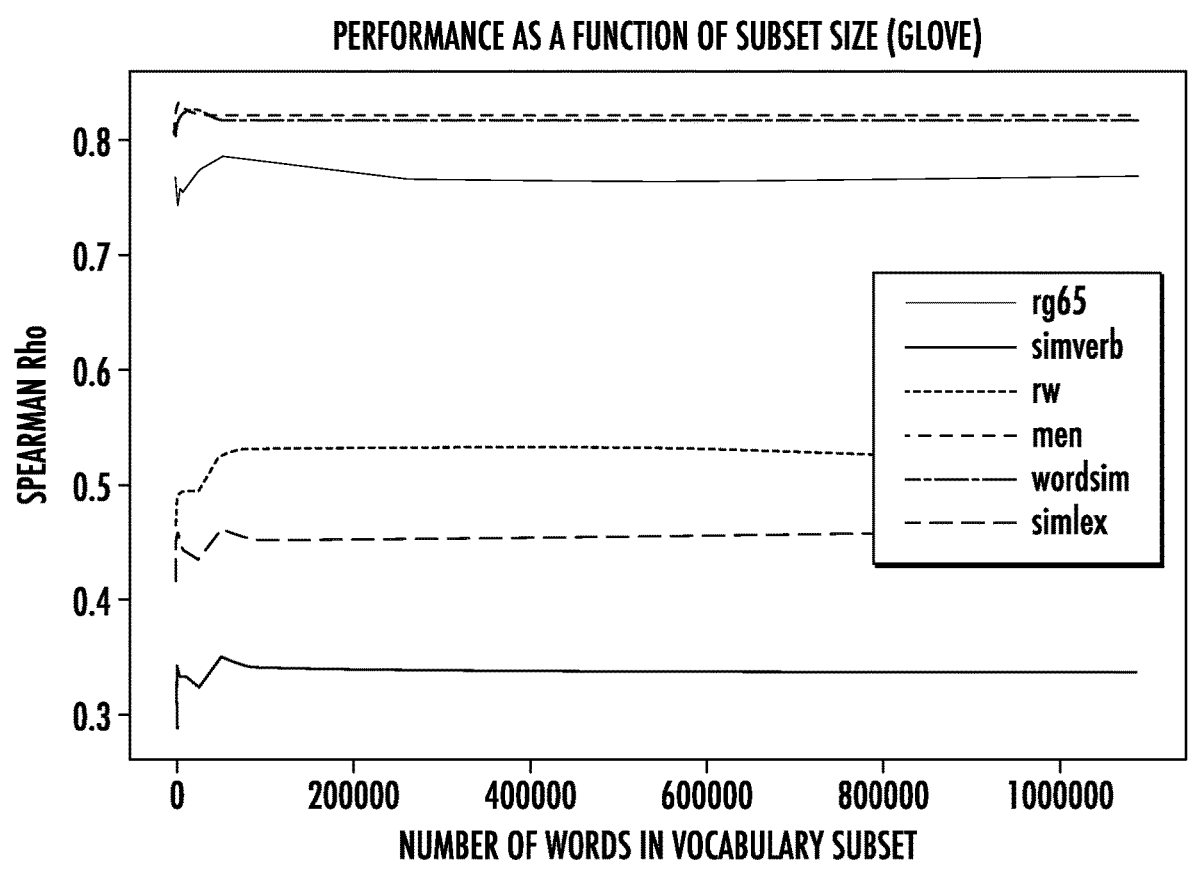
FIGS. 2-5 depict example experimental results according to example embodiments of the present disclosure.
Figure 3:
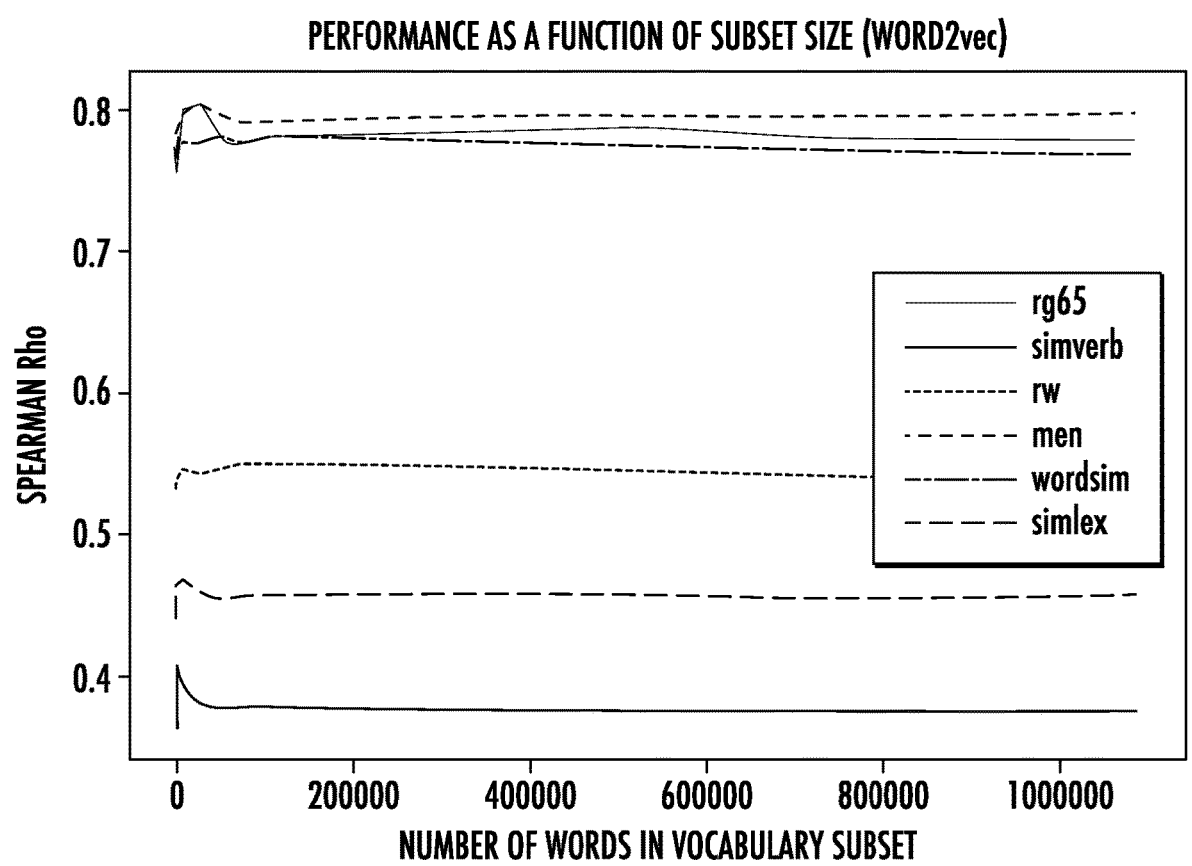

To explore the effect of excluding infrequent words, the first N embeddings were extracted, varying N from 10 to ~1M (the full vocabulary size). FIGS. 2 and 3 show the effect of subset size on performance for GloVe and word2vec, respectively. In particular, FIG. 2 depicts the performance of postprocessed GloVe embeddings as a function of subset size. FIG. 3 depicts the performance of postprocessed Word2vec embeddings as a function of subset size.

Performance tends to improve as subset size increases but only up to 25 k-50 k words (~2.5-5% of the full vocabulary) after which performance actually degrades. This suggests that including (the vast majority of) less frequent words is not only more computationally expensive, but it also hurts performance.

Table 1 compares against ABTT, which uses the full vocabulary.

TABLE 1

Comparison with ABTT as measured by Spearman's Rho (×100). The table reports both the median best-performing subset size of the N most frequent words (N = 25k), as well as the best performing subset for each benchmark (N = #k). Fixing the subset size nearly always produces better results than using the full vocabulary, but tuning the subset size per benchmark can yield further gains.

|  | WORD2VEC | | | | GLOVE | | | |
| --- | --- | --- | --- | --- | --- | --- | --- | --- |
|  | Orig. | ABTT | Ours (25k) | Ours (Tuned) | Orig. | ABTT | Ours (25k) | Ours (Tuned) |
| MEN | 78.20 | 79.77 | 80.30 | 80.30 (25k) | 80.49 | 81.36 | 82.18 | 83.16 (2.5k) |
| RW | 53.42 | 53.09 | 54.33 | 54.98 (100k) | 46.16 | 47.43 | 49.28 | 53.15 (250k) |
| WS | 77.17 | 76.97 | 77.52 | 78.04 (100k) | 80.31 | 81.09 | 82.53 | 82.53 (25k) |
| SimVerb | 36.35 | 36.84 | 38.03 | 40.20 (500) | 28.33 | 30.69 | 32.29 | 34.76 (50k) |
| SimLex | 44.20 | 45.56 | 45.94 | 46.85 (7.5k) | 40.83 | 43.45 | 43.29 | 45.77 (50k) |
| RG65 | 76.01 | 79.83 | 80.40 | 80.40 (25k) | 76.90 | 76.27 | 77.14 | 78.48 (50k) |

Example Benchmark Vocabulary Subsets

As a simple baseline, example experiments also performed these transformations with the vocabulary of the benchmarks themselves. Interestingly, as shown in Table 2, best performance on a given benchmark was not typically observed when that benchmark's vocabulary is used to calculate the mean and principal components.

TABLE 2

Confusion matrix showing performance of GloVe embeddings on subsets drawn from each of the benchmark vocabularies. In the final column, we also report performance for the union of all benchmark vocabularies.

|  | Benchmark Vocab | | | | | | |
| --- | --- | --- | --- | --- | --- | --- | --- |
|  | MEN | RW | WS | SimVerb | SimLex | RG65 | All |
| MEN | 78.23 | 81.10 | 81.23 | 81.67 | 82.27 | 79.53 | 83.75 |
| RW | 46.85 | 53.83 | 46.35 | 49.09 | 47.51 | 46.52 | 53.27 |
| WS | 80.86 | 80.59 | 77.67 | 80.37 | 79.61 | 81.30 | 79.06 |
| SimVerb | 29.85 | 33.02 | 28.37 | 27.68 | 28.60 | 28.08 | 33.98 |
| SimLex | 42.94 | 43.49 | 41.69 | 40.72 | 41.85 | 40.72 | 45.29 |
| RG65 | 78.69 | 75.46 | 74.55 | 75.03 | 74.27 | 79.04 | 70.14 |

Example Contextual Word Embeddings

Given the importance of contextual word embeddings, example experiments also explored whether these gains would extend to embeddings distilled from contextual language models such as BERT and GPT-2. To this end, example experiments reduced contextual word embeddings to static word embeddings, using mean pooling over both context and subword units. To gather these contextual word embeddings, example experiments used the HuggingFace Transformers library, namely the pre-trained bert-base-uncased (12 layers, 768 dims), bert-large-uncased (24 layers, 1024 dims), gpt2 (12 layers, 768 dims) and gpt2-medium (24 layers, 1024 dims). Example experiments distilled embeddings from each layer and across N=100 k contexts sampled from filtered English Wikipedia.

Contextual word embeddings are far more expensive to generate in terms of both compute and memory consumption. In order to quickly demonstrate that postprocessing a subset of contextual embeddings is effective, example experiments generated results on the simple subsetting baseline described above, which generally underperforms frequency-based subsetting. Tables 3 and 4 nevertheless show that performing these transformations on a subset of the vocabulary also improves the performance of contextual word embeddings.

Example Impact on Isotropy of Embeddings

Figure 4:
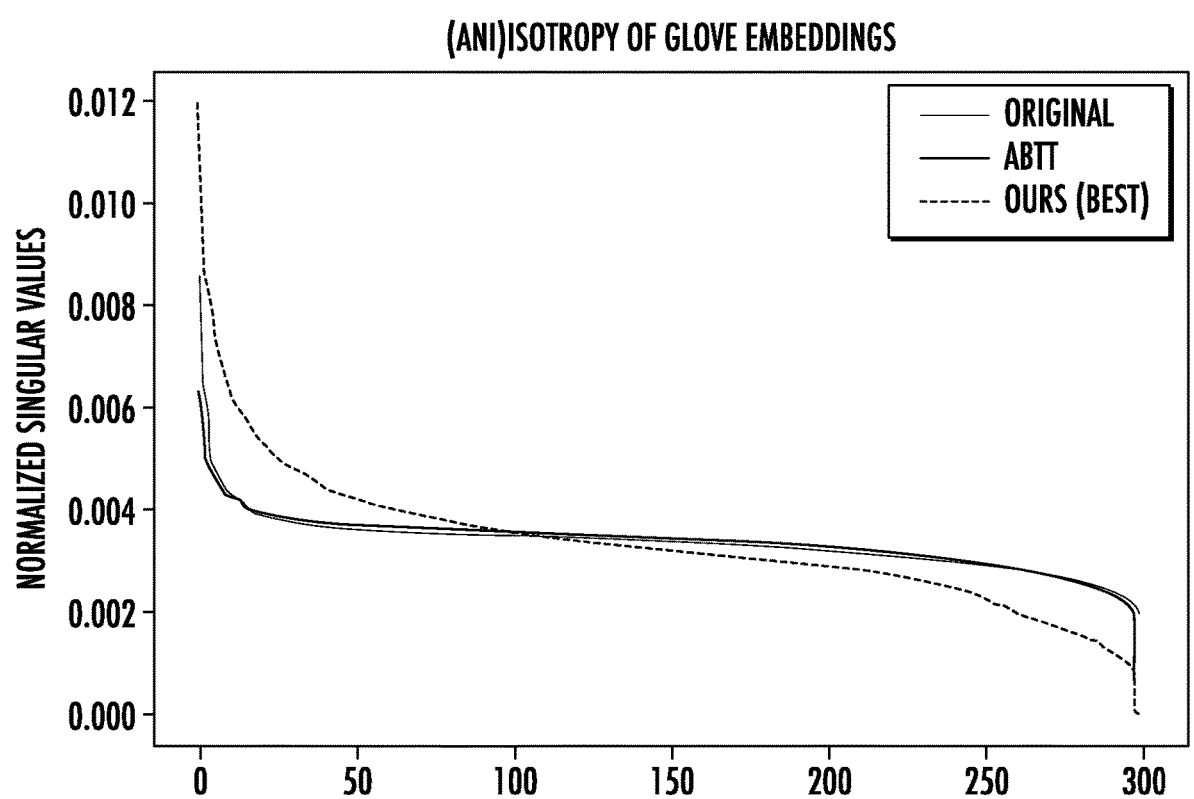
Figure 5:
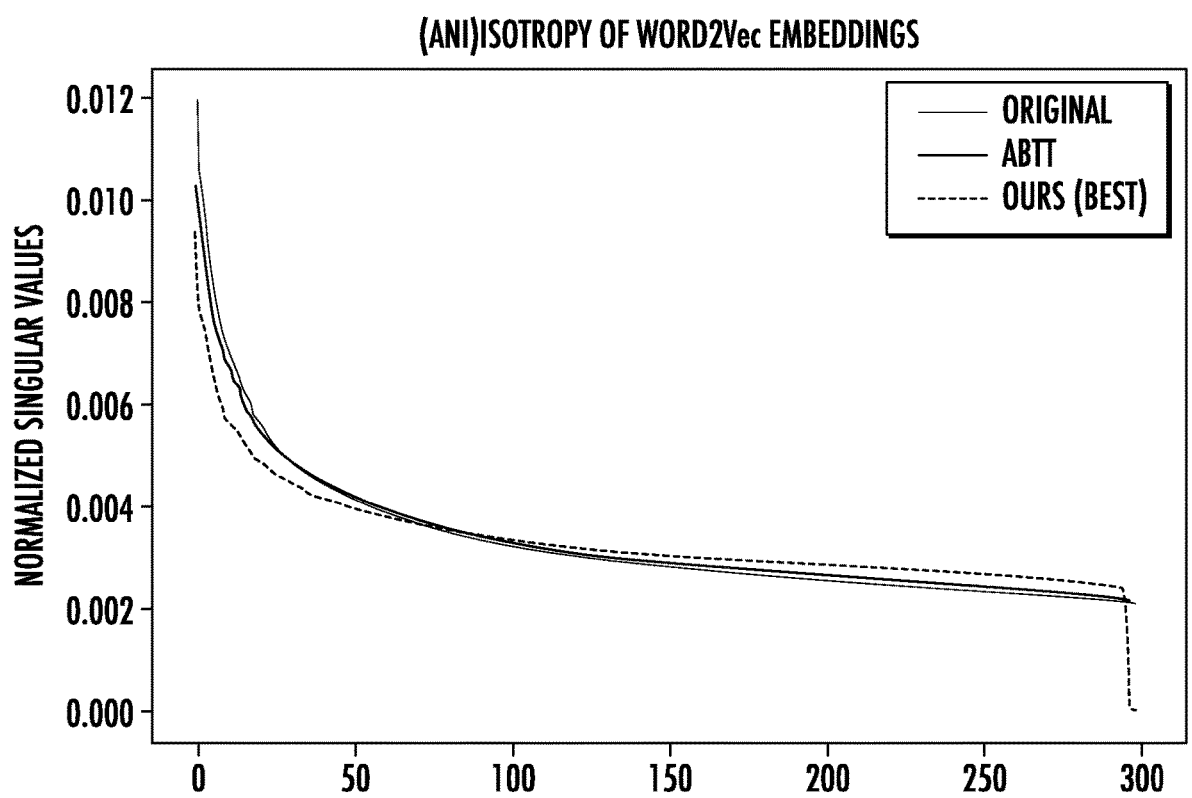

To better understand the performance gains, example experiments inspected the singular values of GloVe and Word2vec embeddings after ABTT and the best performing subset (see FIGS. 4 and 5). Example experiments demonstrated that ABTT embeddings are indeed more isotropic than the original ones, as measured by the ratio between the first singular value and the tenth. However, counter to the suggestion that isotropy improves performance, example implementations of the methods described herein produced embeddings that were less isotropic than ABTT embeddings, and yet yield better performance.

FIG. 4 shows singular values for GloVe embeddings, ABTT embeddings, and subset embeddings. FIG. 5 shows singular values for Word2Vec embeddings, ABTT embeddings, and subset embeddings.

TABLE 3

Performance of BERT embeddings as measured by Spearman's Rho (×100). Subtracted refers to embeddings after mean subtraction, and Removed after principal component removal. (#-#) corresponds to the layer from which the embeddings were distilled and the number of principal components that were removed.

| | BERT-12 | | | BERT-24 | | |
|---|---|---|---|---|---|---|
| | Original | Subtracted | Removed | Original | Subtracted | Removed |
| MEN | 72.83 (1) | 75.52 (11) | 78.96 (11-2) | 74.67 (6) | 77.58 (21) | 78.85 (22-2) |
| RW | 40.57 (5) | 39.92 (7) | 39.87 (7-2) | 44.05 (6) | 41.89 (15) | 41.14 (15-2) |
| WS | 68.54 (1) | 71.27 (12) | 73.52 (11-3) | 70.96 (6) | 73.82 (23) | 73.07 (22-2) |
| SimVerb | 38.99 (5) | 40.68 (6) | 44.06 (6-3) | 40.81 (10) | 43.02 (15) | 44.28 (15-2) |
| SimLex | 50.69 (0) | 51.71 (8) | 53.45 (9-2) | 54.02 (15) | 55.30 (19) | 55.73 (23-2) |
| RG65 | 81.06 (1) | 81.03 (12) | 84.38 (12-2) | 83.96 (7) | 83.41 (2) | 84.46 (7-2) |

TABLE 4

Performance of GPT-2 embeddings as measured by Spearman's Rho (×100) Subtracted refers to embeddings after mean subtraction and removed after principal component removal. (#-#) corresponds to the layer from which the embeddings were distilled and the number of principal components that were removed.

| | GPT2-12 | | | GPT2-24 | | |
|---|---|---|---|---|---|---|
| | Original | Subtracted | Removed | Original | Subtracted | Removed |
| MEN | 62.87 (1) | 71.57 (1) | 74.65 (1-3) | 63.50 (0) | 72.59 (0) | 73.95 (0-2) |
| RW | 10.29 (1) | 20.22 (1) | 22.45 (6-3) | 12.49 (0) | 22.88 (0) | 26.52 (0-2) |
| WS | 58.75 (0) | 66.05 (1) | 68.87 (1-2) | 59.50 (0) | 64.83 (0) | 67.20 (2-2) |
| SimVerb | 29.45 (6) | 36.38 (1) | 42.24 (3-3) | 30.11 (0) | 37.55 (2) | 42.02 (12-2) |
| SimLex | 43.35 (2) | 46.50 (1) | 50.08 (3-3) | 44.01 (0) | 48.21 (0) | 50.54 (0-2) |
| RG65 | 43.79 (1) | 59.76 (0) | 64.55 (1-2) | 63.96 (2) | 67.55 (2) | 73.07 (6-2) |

Example Devices and Systems

Figure 6A:
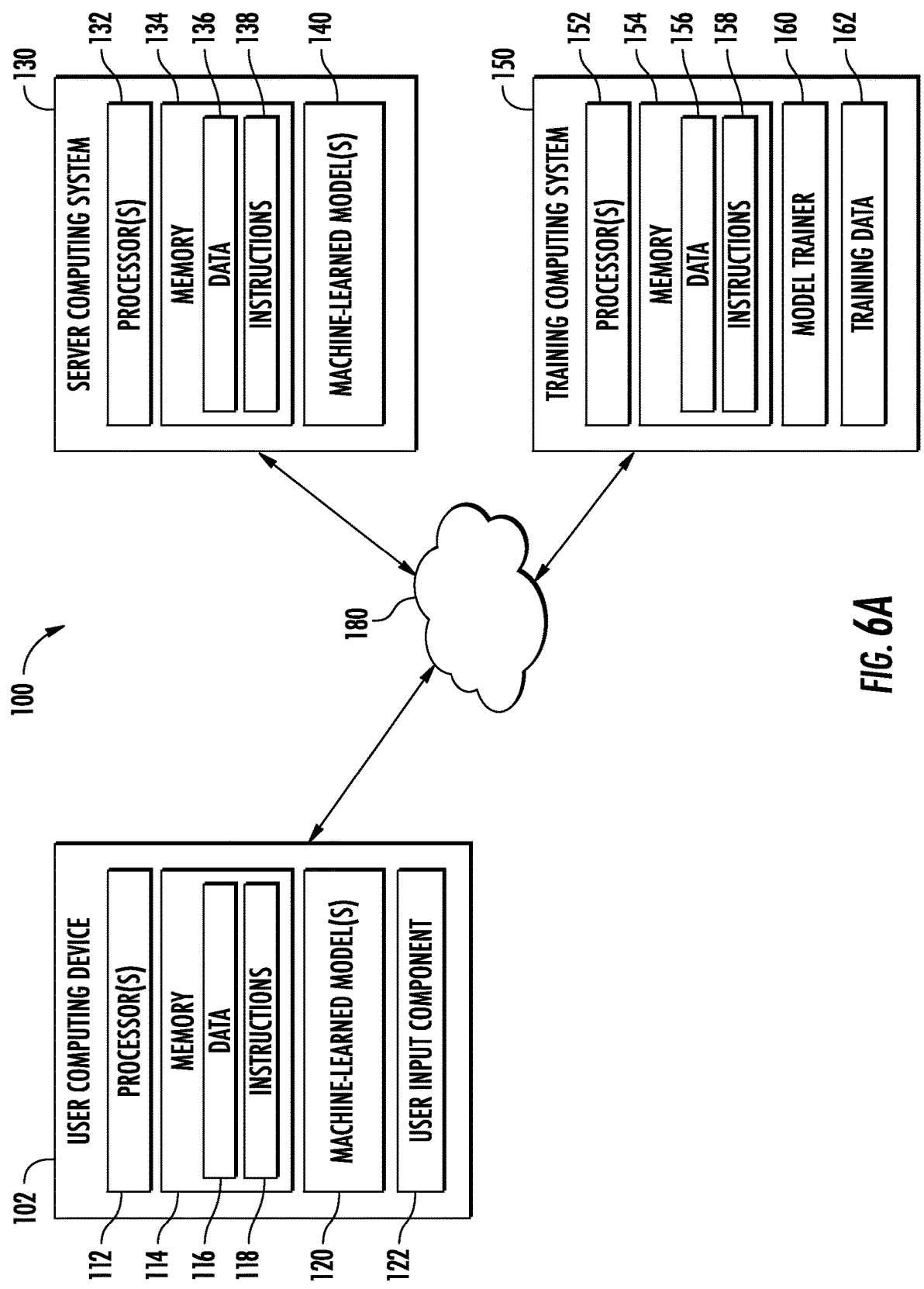
FIG. 6A depicts a block diagram of an example computing system according to example embodiments of the present disclosure.

FIG. 6A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel NLP tasks across multiple instances of a model).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, a corpus of text. In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

FIG. 6A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 6B:
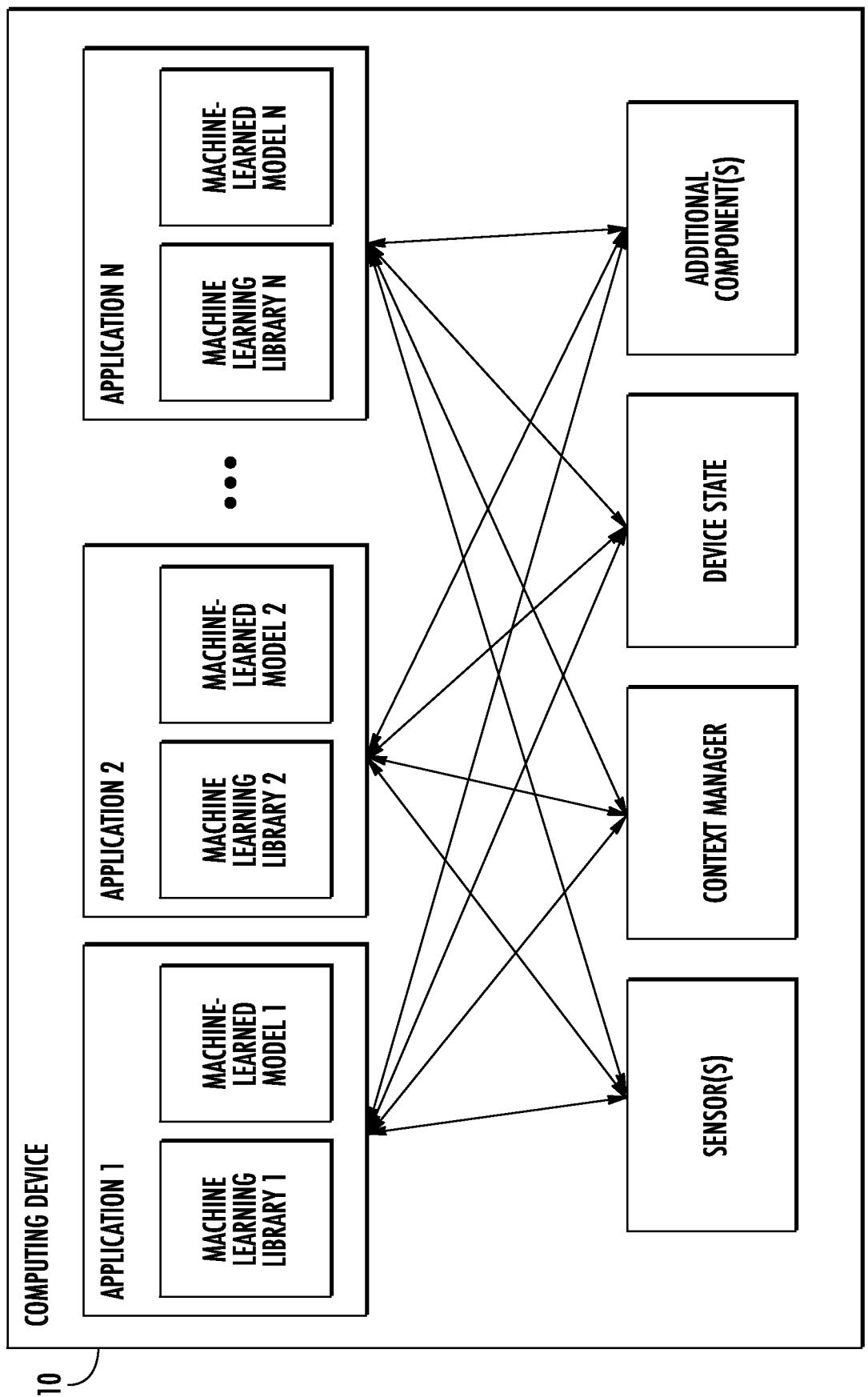
FIG. 6B depicts a block diagram of an example computing device according to example embodiments of the present disclosure.

FIG. 6B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 6B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 6C:
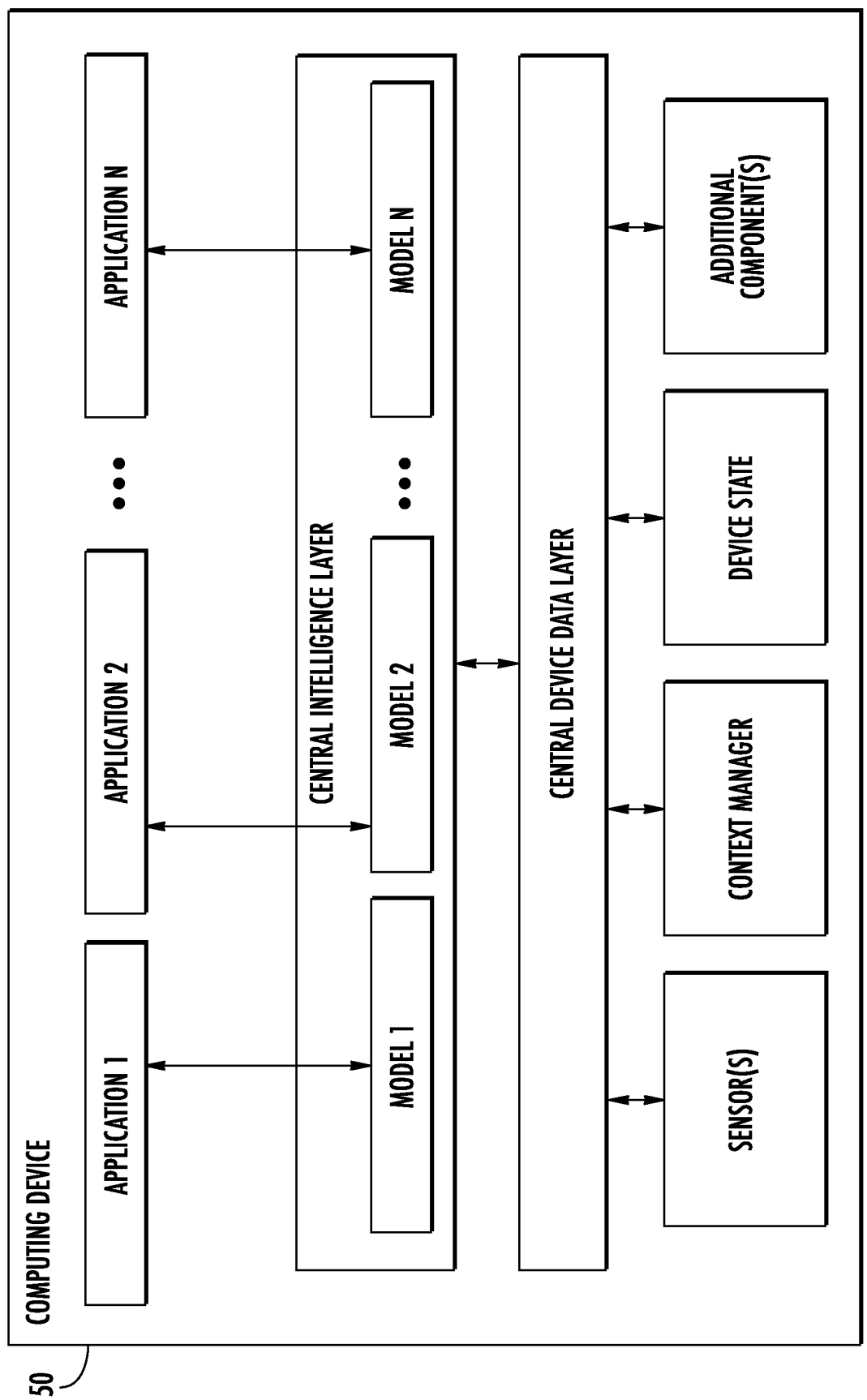
FIG. 6C depicts a block diagram of an example computing device according to example embodiments of the present disclosure.

FIG. 6C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 6C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 6C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to provide improved embeddings-based model performance with reduced computational consumption, the method comprising:
obtaining, by a computing system comprising one or more computing devices, an input set of entity embeddings, wherein the input set of entity embeddings comprises a plurality of embeddings respectively associated with a plurality of entities included in a vocabulary of entities;
selecting, by the computing system, a subset of entity embeddings based on respective frequencies of appearance of the plurality of embeddings in a corpus, the subset of entity embeddings comprising a subset of the plurality of embeddings respectively associated with a subset of the plurality of entities;
performing, by the computing system, one or more embedding modifications on at least the subset of entity embeddings to produce a modified set of entity embeddings, the one or more embedding modifications comprising one or both of:
  subtracting, by the computing system, a mean of the subset of entity embeddings from at least each entity embedding included in the subset of the plurality of embeddings; and
  removing, by the computing system, one or more principal components of the subset of entity embeddings from at least each entity embedding included in the subset of the plurality of embeddings;
outputting, by the computing system, the modified set of entity embeddings as an output set of entity embeddings; and
using the output set of entity embeddings to predict one or more predicted tokens based on a context.

2. The computer-implemented method of claim 1, wherein selecting, by the computing system, the subset of entity embeddings based on the frequency of appearance of the plurality of embeddings in the corpus comprises selecting, by the computing system, a percentage of the plurality of embeddings that appear most frequently in the corpus.

3. The computer-implemented method of claim 2, wherein the percentage is between two to five percent.

4. The computer-implemented method of claim 1, wherein selecting, by the computing system, the subset of entity embeddings comprises selecting, by the computing system, the subset of entity embeddings to include only entity embeddings that correspond to nouns.

5. The computer-implemented method of claim 1, wherein selecting, by the computing system, the subset of entity embeddings comprises selecting, by the computing system, the subset of entity embeddings to include only entity embeddings that are included in an expected vocabulary that is different from the vocabulary.

6. The computer-implemented method of claim 1, wherein the one or more embedding modifications comprise both of:
  said subtracting, by the computing system, the mean of the subset of entity embeddings from at least each entity embedding included in the subset of the plurality of embeddings; and
  said removing, by the computing system, the one or more principal components of the subset of entity embeddings from at least each entity embedding included in the subset of the plurality of embeddings.

7. The computer-implemented method of claim 6, wherein said subtracting, by the computing system, the mean of the subset of entity embeddings from at least each entity embedding included in the subset of the plurality of embeddings is performed prior to said removing, by the computing system, the one or more principal components of the subset of entity embeddings from at least each entity embedding included in the subset of the plurality of embeddings.

8. The computer-implemented method of claim 1, wherein subtracting, by the computing system, the mean of the subset of entity embeddings from at least each entity embedding included in the subset of the plurality of embeddings comprises subtracting, by the computing system, the mean of the subset of entity embeddings from each entity embedding included in the input set of entity embeddings.

9. The computer-implemented method of claim 1, wherein removing, by the computing system, the one or more principal components of the subset of entity embeddings from at least each entity embedding included in the subset of the plurality of embeddings comprises removing, by the computing system, the one or more principal components of the subset of entity embeddings from each entity embedding included in the input set of entity embeddings.

10. The computer-implemented method of claim 1, wherein the input set of entity embeddings comprise a set of static entity embeddings.

11. The computer-implemented method of claim 1, wherein the input set of entity embeddings comprise a set of contextual entity embeddings that have been reduced to a set of static entity embeddings.

12. The computer-implemented method of claim 1, further comprising:
  using, by the computing system, the output set of entity embeddings to predict one or more sequences of predicted tokens based on a context.

13. The computer-implemented method of claim 1, further comprising:
  training, by the computing system, a machine-learned language model using the output set of entity embeddings.

14. A computing system configured to provide improved embeddings-based model performance with reduced computational consumption, the computing system comprising:
  one or more processors; and
  one or more non-transitory computer-readable media storing:
    a machine-learned language model; and
    instructions that, when implemented, cause the one or more processors to perform operations, the operations comprising:
      obtaining an input set of entity embeddings, wherein the input set of entity embeddings comprises a plurality of embeddings respectively associated with a plurality of entities included in a vocabulary of entities;
      selecting a subset of entity embeddings based on respective frequencies of appearance of the plurality of embeddings in a corpus, the subset of entity embeddings comprising a subset of the plurality of embeddings respectively associated with a subset of the plurality of entities;
      performing one or more embedding modifications on at least the subset of entity embeddings to produce a modified set of entity embeddings;
      outputting the modified set of entity embeddings as the output set of entity embeddings;
      training the machine-learned language model using the output set of entity embeddings; and
      using the machine-learned language model to predict one or more predicted tokens based on a context.

15. The computing system of claim 14, wherein selecting the subset of entity embeddings based on the frequency of appearance of the plurality of embeddings in the corpus comprises selecting, by the computing system, a percentage of the plurality of embeddings that appear most frequently in the corpus.

16. The computing system of claim 14, wherein selecting the subset of entity embeddings comprises selecting the subset of entity embeddings to include only entity embeddings that correspond to nouns.

17. The computing system of claim 14, wherein selecting the subset of entity embeddings comprises selecting the subset of entity embeddings to include only entity embeddings that are included in an expected vocabulary that is different from the vocabulary.

18. The computing system of claim 14, wherein the input set of entity embeddings comprise a set of static entity embeddings.

19. The computing system of claim 14, wherein the operations further comprise using the output set of entity embeddings to predict one or more predicted tokens based on a context.

20. One or more non-transitory, computer-readable media that collectively store:
- a machine-learned language model; and
- instructions that, when implemented, cause one or more processors to perform operations, the operations comprising:
  - obtaining an input set of entity embeddings, wherein the input set of entity embeddings comprises a plurality of embeddings respectively associated with a plurality of entities included in a vocabulary of entities;
  - selecting a subset of entity embeddings based on respective frequencies of appearance of the plurality of embeddings in a corpus, the subset of entity embeddings comprising a subset of the plurality of embeddings respectively associated with a subset of the plurality of entities;
  - performing one or more embedding modifications on at least the subset of entity embeddings to produce a modified set of entity embeddings;
  - outputting the modified set of entity embeddings as an output set of entity embeddings; and
  - using the output set of entity embeddings to predict one or more predicted tokens based on a context.

* * * * *